United States Patent
Tajima et al.

(10) Patent No.: US 10,209,700 B2
(45) Date of Patent: Feb. 19, 2019

(54) MACHINE TOOL CONTROLLER HAVING FUNCTION OF CHANGING OPERATION ACCORDING TO MOTOR TEMPERATURE AND AMPLIFIER TEMPERATURE

(71) Applicant: FANUC CORPORATION, Yamanashi (JP)

(72) Inventors: Daisuke Tajima, Yamanashi (JP); Tadashi Okita, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 62 days.

(21) Appl. No.: 15/377,346

(22) Filed: Dec. 13, 2016

(65) Prior Publication Data

US 2017/0185067 A1    Jun. 29, 2017

(30) Foreign Application Priority Data

Dec. 24, 2015  (JP) ................................ 2015-252607

(51) Int. Cl.
  *B23Q 11/00*    (2006.01)
  *B23Q 5/10*    (2006.01)
  (Continued)

(52) U.S. Cl.
  CPC ............. *G05B 19/406* (2013.01); *B23Q 5/10* (2013.01); *B23Q 5/58* (2013.01); *B23Q 11/0003* (2013.01);
  (Continued)

(58) Field of Classification Search
  CPC ... B23Q 11/0003; B23Q 11/127; B23Q 11/14; B23Q 5/10; B23Q 5/58; G05B 19/406;
  (Continued)

(56) References Cited

U.S. PATENT DOCUMENTS 5,123,081 A * 6/1992 Bachman ............. H02H 7/0852
                                                                 318/472
6,291,959 B1 * 9/2001 Yoshida ............... G05B 19/404
                                                                 318/567
(Continued)

FOREIGN PATENT DOCUMENTS

JP    A H09-179623    7/1997
JP    A-2003-009563    1/2003
(Continued)

*Primary Examiner* — Abdelmoniem I Elamin
(74) *Attorney, Agent, or Firm* — RatnerPrestia (57) ABSTRACT

A machine tool controller according to an embodiment of the present invention, for controlling a spindle and a feed axis, includes a motor temperature obtaining unit for obtaining and outputting the winding temperature of a spindle motor as a motor temperature; an inverter temperature obtaining unit for obtaining and outputting the temperature of an inverter that drives the spindle motor as an inverter temperature; a motor temperature comparator for comparing the outputted motor temperature with an overheat temperature for the motor; an inverter temperature comparator for comparing the outputted inverter temperature with an overheat temperature for the inverter; and an overheating assessment unit for imposing a restriction on the output of the spindle motor according to the smaller one of the differences between the motor temperature and the overheat temperature for the motor and between the inverter temperature and the overheat temperature for the inverter.

9 Claims, 6 Drawing Sheets (51) Int. Cl.
  *B23Q 5/58* (2006.01)
  *G05B 19/406* (2006.01)
  *B23Q 11/12* (2006.01)
  *B23Q 11/14* (2006.01)
  *G05B 19/4062* (2006.01)

(52) U.S. Cl.
  CPC ............ *B23Q 11/127* (2013.01); *B23Q 11/14* (2013.01); *G05B 19/4062* (2013.01); *G05B 2219/37249* (2013.01); *G05B 2219/37429* (2013.01)

(58) Field of Classification Search
  CPC ...... G05B 19/4062; G05B 2219/37249; G05B 2219/37429
  See application file for complete search history.

(56) References Cited

U.S. PATENT DOCUMENTS

| | | | | |
|---|---|---|---|---|
| 7,199,549 B2* | 4/2007 | Kleinau | ................. | B60L 11/14 318/787 |
| 8,975,852 B2* | 3/2015 | Petersson | ................. | H02P 23/14 318/490 |
| 9,509,131 B2* | 11/2016 | Sagasaki | ............ | G05B 19/4062 |
| 9,906,184 B2* | 2/2018 | Yato | ......................... | G01K 7/00 |
| 2011/0279074 A1* | 11/2011 | Yeh | .......................... | G01K 7/42 318/432 |
| 2011/0309776 A1* | 12/2011 | Miyamoto | .............. | H02P 27/06 318/139 |
| 2012/0299521 A1* | 11/2012 | Petersson | ................. | H02P 23/14 318/490 |
| 2014/0197765 A1* | 7/2014 | Kim | ........................ | H02P 27/08 318/400.2 |
| 2015/0194805 A1* | 7/2015 | Sagasaki | ............ | G05B 19/4062 318/569 |

FOREIGN PATENT DOCUMENTS

| | | |
|---|---|---|
| JP | 2012237533 A | 12/2012 |
| JP | B-5160834 | 3/2013 |
| JP | 2013085377 A | 5/2013 |
| JP | 2015075994 A | 4/2015 |
| JP | B-5727572 | 6/2015 |

* cited by examiner

FIG. 2

FIG. 4

MACHINE TOOL CONTROLLER HAVING FUNCTION OF CHANGING OPERATION ACCORDING TO MOTOR TEMPERATURE AND AMPLIFIER TEMPERATURE

This application is a new U.S. patent application that claims benefit of JP 2015-252607 filed on Dec. 24, 2015, the content of 2015-252607 is incorporated herein by reference.

BACKGROUND OF THE INVENTION

1. Field of the Invention

The present invention relates to a machine tool controller, and specifically relates to a machine tool controller having the function of changing operation according to a motor temperature and an amplifier temperature.

2. Description of Related Art

In machine tools having a spindle and a feed axis driven by motors, an increase in a motor temperature or an amplifier temperature may cause overheating of the motor or an amplifier owing to machining conditions of the spindle such as heavy cutting or a high frequency of acceleration and deceleration, an installation environment, and the like.

As a method for preventing overheating, a servomotor control device that includes a temperature detector for detecting the temperature of a servomotor to drive a movable member, and a temperature responding controller for controlling the servomotor so as to vary an acceleration and deceleration time constant of the movable member according to the detected temperature is known (for example, Japanese Unexamined Patent Publication (Kokai) No. 2003-9563).

As another method for preventing overheating, there is known a mechanical device controlling method in which a temperature data calculator estimates the temperature of a drive unit such as a feed axis motor of a mechanical device and generates temperature data, and an acceleration and deceleration time constant calculator compares the temperature data with allowable predetermined temperature data stored in advance in a data memory to vary an acceleration and deceleration time constant of a feed axis according to the comparison result (for example, Japanese Unexamined Patent Publication (Kokai) No. 9-179623).

As yet another method for preventing overheating, there is known a motor controller in which a torque monitor monitors a torque over a predetermined time period as a load on a main motor, and a temperature estimation circuit calculates a virtual motor temperature based on an average load torque, that is, the monitoring result by the torque monitor, and a protection circuit compares the virtual temperature with a predetermined allowable temperature. When the virtual temperature exceeds the allowable temperature, a speed reduction ratio is set at 0.9 to impose a speed restriction. When the virtual temperature has been recovered, the speed reduction ratio is returned to an initial value 1.0 (for example, Japanese Patent No. 5160834).

Furthermore, as yet another method for preventing overheating, a method in which a temperature increase estimator is provided to estimate a temperature increase resulting from each of an acceleration and deceleration current and a steady current is known. According to the magnitude relationship between them, when the temperature increase resulting from the acceleration and deceleration current is predominant, the output of a spindle motor is reduced. When the temperature increase resulting from the steady current is predominant, the speed of a feed axis is reduced (for example, Japanese Patent No. 5727572).

SUMMARY OF THE INVENTION

Since the conventional measures against overheating do not consider heat generation by an amplifier to drive a motor, overheating cannot be prevented by imposing an output restriction in consideration of an assessment of overheating of the amplifier, which becomes a problem during driving the motor.

A controller according to an embodiment of the present invention is a machine tool controller for controlling a spindle and a feed axis. The controller includes a motor temperature obtaining unit for obtaining the winding temperature of a spindle motor and outputting the winding temperature as a motor temperature; an inverter temperature obtaining unit for obtaining the temperature of an inverter to drive the spindle motor and outputting the temperature as an inverter temperature; a motor temperature comparator for comparing the outputted motor temperature with an overheat temperature for the motor; an inverter temperature comparator for comparing the outputted inverter temperature with an overheat temperature for the inverter; and an overheating assessment unit for imposing a restriction on the output of the spindle motor according to the smaller one of the difference between the motor temperature and the overheat temperature for the motor and the difference between the inverter temperature and the overheat temperature for the inverter.

A controller according to another embodiment of the present invention is a machine tool controller for controlling a spindle and a feed axis. The controller includes a motor temperature obtaining unit for obtaining the winding temperature of a spindle motor and outputting the winding temperature as a motor temperature; an inverter temperature obtaining unit for obtaining the temperature of an inverter to drive the spindle motor and outputting the temperature as an inverter temperature; a reactor temperature obtaining unit for obtaining the winding temperature of a reactor provided between the inverter and the spindle motor, and outputting the winding temperature as a reactor temperature; a motor temperature comparator for comparing the outputted motor temperature with an overheat temperature for the motor; an inverter temperature comparator for comparing the outputted inverter temperature with an overheat temperature for the inverter; a reactor temperature comparator for comparing the outputted reactor temperature with an overheat temperature for the reactor; and an overheating assessment unit for imposing a restriction on the output of the spindle motor according to the smallest one of the difference between the motor temperature and the overheat temperature for the motor, the difference between the inverter temperature and the overheat temperature for the inverter, and the difference between the reactor temperature and the overheat temperature for the reactor.

BRIEF DESCRIPTION OF THE DRAWINGS

The objects, features, and advantages of the present invention will be more apparent from the following description of embodiments in conjunction with the attached drawings, wherein.

DETAILED DESCRIPTION OF THE INVENTION

A machine tool controller according to the present invention will be described below with reference to the drawings.

First Embodiment

Figure 1:
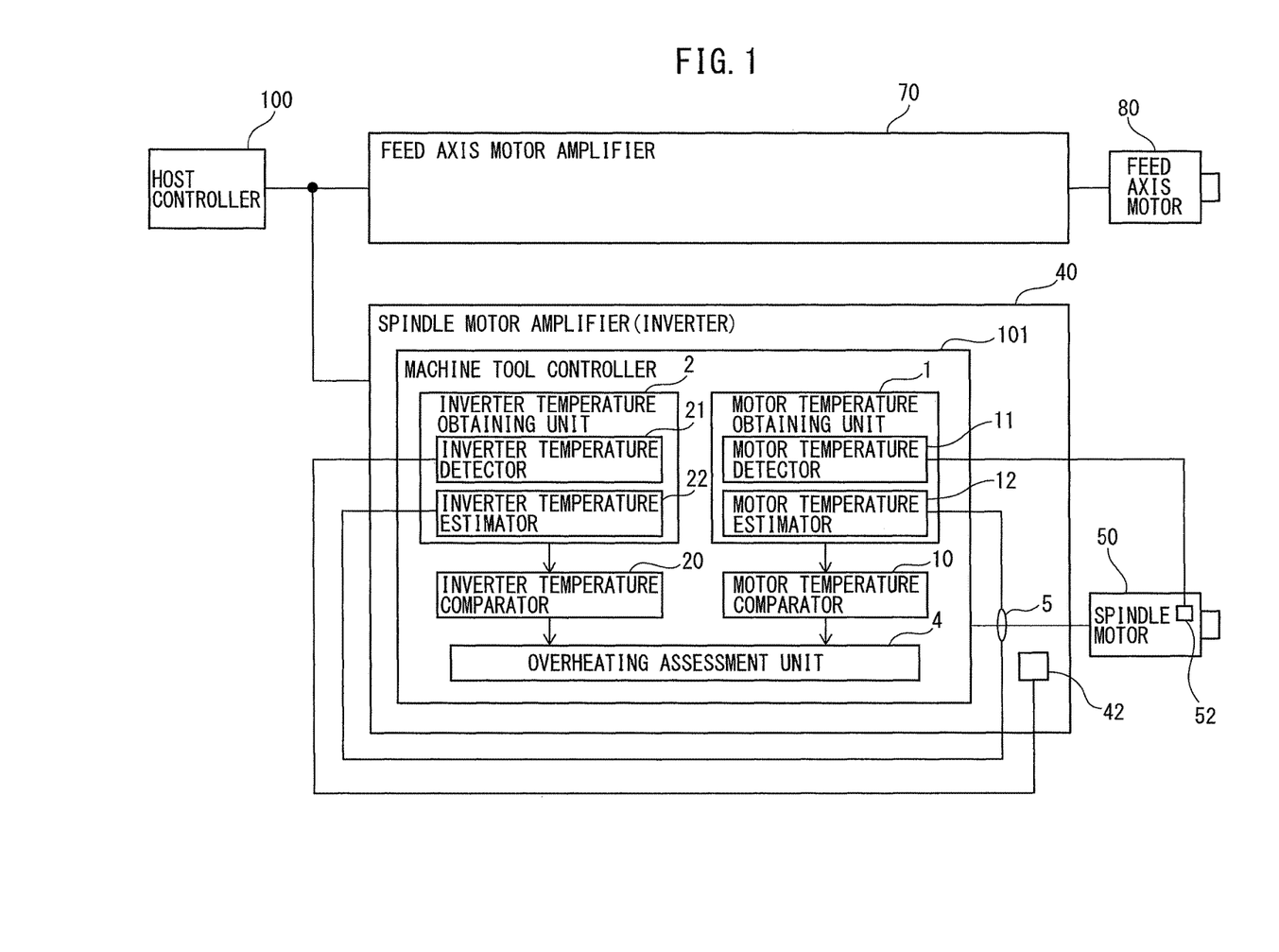
FIG. 1 is a block diagram showing the configuration of a control system including a machine tool controller according to a first embodiment of the present invention.

A machine tool controller according to a first embodiment of the present invention will be first described. FIG. 1 is a block diagram showing the configuration of a control system including the machine tool controller according to the first embodiment of the present invention. The control system includes a host controller 100, a spindle motor amplifier 40, a spindle motor 50, a feed axis motor amplifier 70, and a feed axis motor 80. A machine tool controller 101 according to the first embodiment of the present invention is provided within the spindle motor amplifier (hereinafter also called "inverter") 40. The machine tool controller 101 is a controller for a machine tool, for controlling a spindle axis. The machine tool controller 101 includes a motor temperature obtaining unit 1, an inverter temperature obtaining unit 2, a motor temperature comparator 10, an inverter temperature comparator 20, and an overheating assessment unit 4. The machine tool controller 101 is provided within the inverter 40, that is, the spindle motor amplifier to drive the spindle motor 50. The machine tool controller 101 controls the output of the inverter 40 in response to commands from the host controller 100.

The motor temperature obtaining unit 1 obtains the winding temperature of the spindle motor 50, and outputs the winding temperature to the motor temperature comparator 10 as a motor temperature. The motor temperature obtaining unit 1 includes at least one of a motor temperature detector 11 and a motor temperature estimator 12. The motor temperature detector 11 measures the winding temperature of the spindle motor 50 using a temperature sensor 52 such as a thermistor provided in the spindle motor 50. The motor temperature estimator 12 estimates the winding temperature of the spindle motor 50 from current feedback detected at the spindle motor amplifier (inverter) 40, that is, a current flowing through the spindle motor 50 detected by a current sensor 5 provided in the spindle motor amplifier (inverter) 40. In an example shown in FIG. 1, the motor temperature obtaining unit 1 includes both of the motor temperature detector 11 and the motor temperature estimator 12, but not limited to this example, the motor temperature obtaining unit 1 may include one of the motor temperature detector 11 and the motor temperature estimator 12.

The significance of the observation of both of the measured temperature (actual temperature) and the estimated temperature using both of the motor temperature detector 11 and the motor temperature estimator 12 of the motor temperature obtaining unit 1 is as follows. That is, a sharp current variation causes a sudden increase in the temperature of a motor winding itself (with a small (fast) time constant), while causing a slower increase in the temperature of the temperature sensor such as the thermistor embedded in the motor winding (with a large (slow) time constant). Thus, the estimated temperature is used to monitor overheating with the small time constant, while the measured temperature (actual temperature) is used to monitor overheating with the large time constant.

The inverter temperature obtaining unit 2 obtains the temperature of the inverter 40 which drives the spindle motor 50, and outputs the temperature to the inverter temperature comparator 20 as an inverter temperature. The inverter temperature obtaining unit 2 includes one of an inverter temperature detector 21 and an inverter temperature estimator 22. The inverter temperature detector 21 measures the temperature of the inverter 40 using a temperature sensor 42 such as a thermistor provided in the spindle motor amplifier (inverter) 40. The inverter temperature estimator 22 estimates the temperature of the inverter 40 from current feedback detected at the inverter 40, that is, a current flowing through the inverter 40 detected by the current sensor 5 provided in the inverter 40. In an example shown in FIG. 1, the inverter temperature obtaining unit 2 includes both of the inverter temperature detector 21 and the inverter temperature estimator 22, but not limited to this example, the inverter temperature obtaining unit 2 may include one of the inverter temperature detector 21 and the inverter temperature estimator 22. The inverter 40 is, for example, a spindle motor amplifier that has the function of converting direct current power into alternating current power by a switching operation of a switching element provided therein.

The significance of the observation of both of the measured temperature (actual temperature) and the estimated temperature using both of the inverter temperature detector 21 and the inverter temperature estimator 22 of the inverter temperature obtaining unit 2 is as follows. That is, the temperature of the amplifier itself (a heatsink of the amplifier) and the temperature of a power device increase with different time constants. The amplifier has a large (slow) time constant, while the power device has a small (fast) time constant. Thus, the measured temperature (actual temperature) is used to monitor overheating with the large time constant, while the estimated temperature is used to monitor overheating with the small time constant.

The motor temperature comparator 10 compares the motor temperature outputted from the motor temperature obtaining unit 1 with an overheat temperature for the motor. The overheat temperature for the motor, which refers to a temperature at which the spindle motor becomes overheated, is stored in advance in a memory (not shown).

The inverter temperature comparator 20 compares the inverter temperature outputted from the inverter temperature obtaining unit 2 with an overheat temperature for the inverter. The overheat temperature for the inverter, which refers to a temperature at which the inverter becomes overheated, is stored in advance in a memory (not shown).

The overheating assessment unit 4 imposes a restriction on the output of the spindle motor according to the smaller one of the difference between the motor temperature and the overheat temperature for the motor and the difference between the inverter temperature and the overheat temperature for the inverter.

As described above, the machine tool controller according to the first embodiment of the present invention imposes the restriction on the output of the spindle motor by focusing on the temperature closer to the overheat temperature, out of the measured temperatures and the estimated temperatures of the motor and the inverter. That is, the output restriction in consideration of both of the motor temperature and the inverter (amplifier) temperature allows preventing a machine stoppage owing to an overheat alarm.

Figure 2:
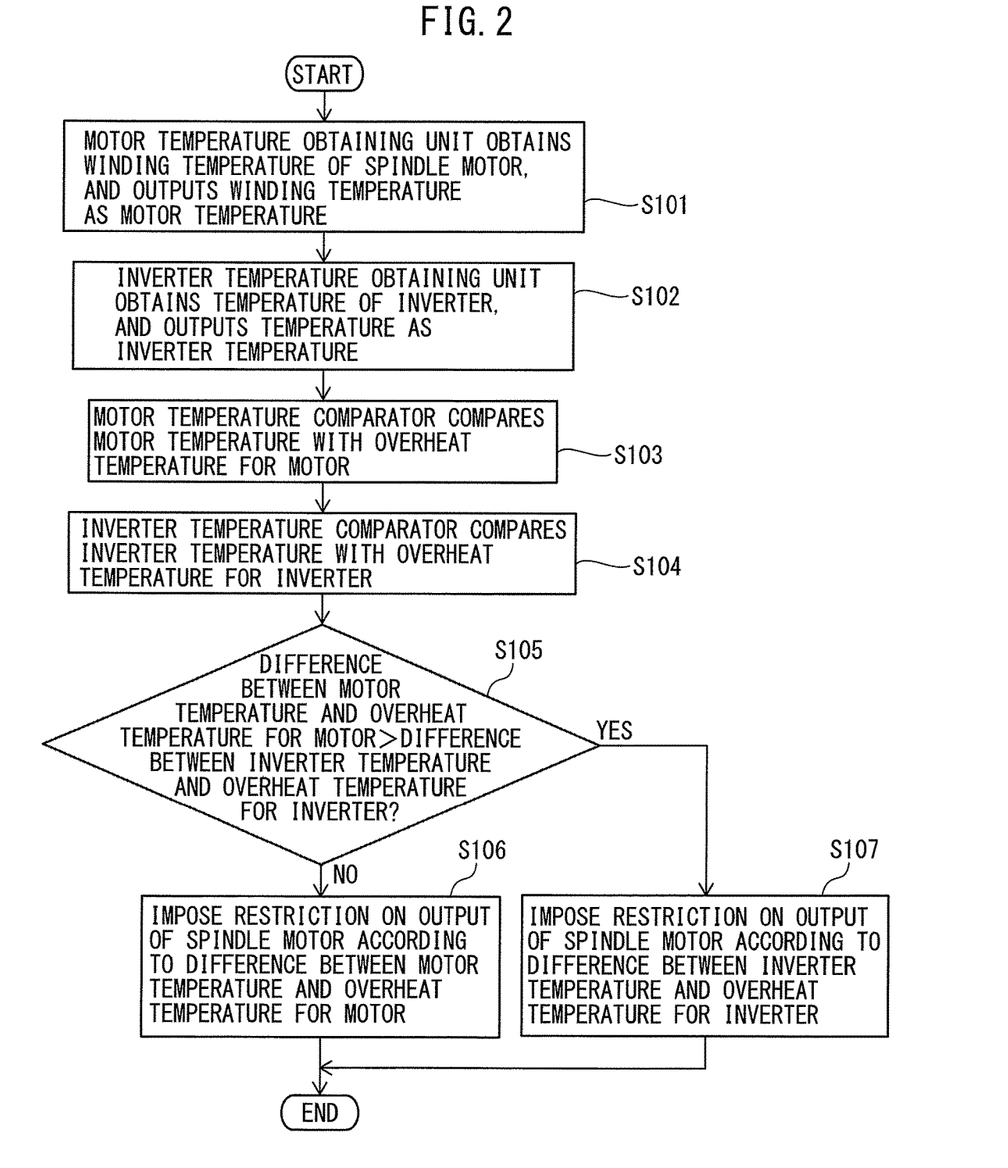
FIG. 2 is a flowchart of the operation of the machine tool controller according to the first embodiment of the present invention.

Next, the operation of the machine tool controller according to the first embodiment of the present invention will be described with reference to a flowchart shown in FIG. 2. First, in step S101, the motor temperature obtaining unit 1 obtains the winding temperature of the spindle motor 50, and outputs the winding temperature to the motor temperature comparator 10 as a motor temperature. As described above, the motor temperature obtaining unit 1 includes at least one of the motor temperature detector 11 and the motor temperature estimator 12. The motor temperature obtaining unit 1 outputs the measured temperature of the spindle motor by the motor temperature detector 11, the estimated temperature of the spindle motor by the motor temperature estimator 12, or both of the measured temperature and the estimated temperature to the motor temperature comparator 10 as the motor temperature.

Next, in step S102, the inverter temperature obtaining unit 2 obtains the temperature of the spindle motor amplifier, i.e. inverter 40, and outputs the temperature to the inverter temperature comparator 20 as an inverter temperature. As described above, the inverter temperature obtaining unit 2 includes at least one of the inverter temperature detector 21 and the inverter temperature estimator 22. The inverter temperature obtaining unit 2 outputs the measured temperature of the inverter 40 by the inverter temperature detector 21, the estimated temperature of the inverter 40 by the inverter temperature estimator 22, or both of the measured temperature and the estimated temperature to the inverter temperature comparator 20 as the temperature of the inverter (spindle motor amplifier) 40.

Next, in step S103, the motor temperature comparator 10 compares the motor temperature outputted from the motor temperature obtaining unit 1 with an overheat temperature for the motor. To be more specific, the motor temperature comparator 10 calculates the difference between the motor temperature and the overheat temperature for the motor, and outputs the difference to the overheating assessment unit 4. The difference between the motor temperature and the overheat temperature for the motor is calculated using the measured temperature, the estimated temperature, or both of the measured temperature and the estimated temperature as the motor temperature.

Next, in step S104, the inverter temperature comparator 20 compares the inverter temperature obtained by the inverter temperature obtaining unit 2 with an overheat temperature for the inverter. To be more specific, the inverter temperature comparator 20 calculates the difference between the inverter temperature and the overheat temperature for the inverter, and outputs the difference to the overheating assessment unit 4. The difference between the inverter temperature and the overheat temperature for the inverter is calculated using the measured temperature, the estimated temperature, or both of the measured temperature and the estimated temperature as the inverter temperature.

Next, in step S105, the overheating assessment unit 4 determines whether or not the difference between the motor temperature and the overheat temperature for the motor is more than the difference between the inverter temperature and the overheat temperature for the inverter. When the difference between the motor temperature and the overheat temperature for the motor is equal to or less than the difference between the inverter temperature and the overheat temperature for the inverter, the spindle motor 50 has a temperature closer to the overheat temperature and therefore is determined to be closer to an overheated state than the inverter 40. In this case, in step S106, the machine tool controller 101 imposes a restriction on the output of the spindle motor 50 according to the difference between the motor temperature and the overheat temperature for the motor.

On the other hand, when the difference between the motor temperature and the overheat temperature for the motor is more than the difference between the inverter temperature and the overheat temperature for the inverter, the inverter 40 has a temperature closer to the overheat temperature and therefore is determined to be closer to an overheated state than the spindle motor 50. In this case, in step S107, the machine tool controller 101 imposes a restriction on the output of the spindle motor 50 according to the difference between the inverter temperature and the overheat temperature for the inverter.

Figure 3:
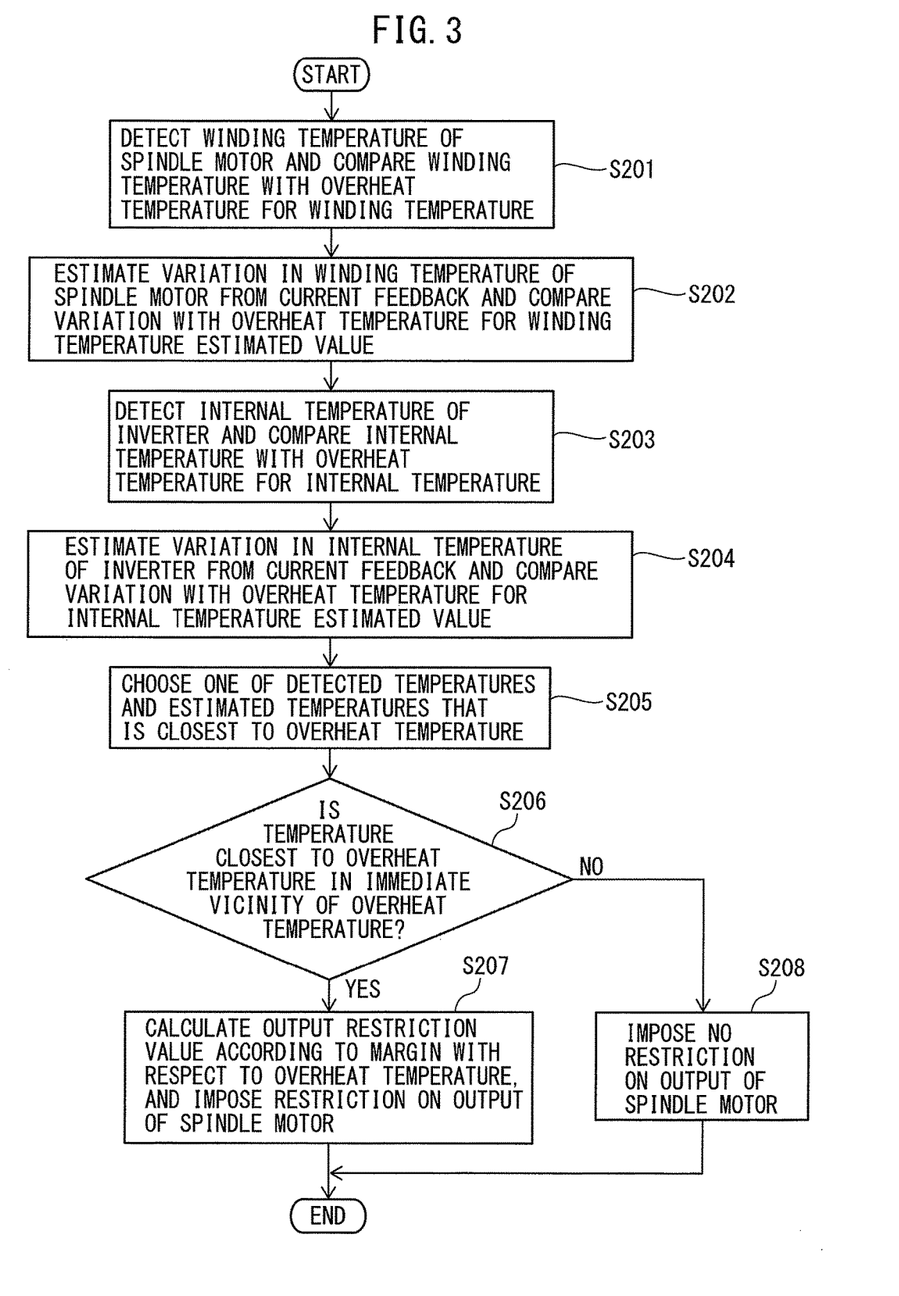
FIG. 3 is a flowchart of the operation of the machine tool controller according to a modification example of the first embodiment of the present invention.

Next, the operation of the machine tool controller according to a modification example of the first embodiment of the present invention will be described with reference to FIG. 3. First, in step S201, the winding temperature of the spindle motor 50 is detected and compared with an overheat temperature for the winding temperature.

Next, in step S202, a variation in the winding temperature of the spindle motor 50 is estimated from current feedback and compared with an overheat temperature for the winding temperature estimated value. As for the spindle motor 50, one or both of the measured temperature and the estimated temperature may be used for determining an output restriction.

Here, "the overheat temperature for the winding temperature" is preferably different from "the overheat temperature for the winding temperature estimated value". "The overheat temperature for the winding temperature" is an overheat temperature with respect to an actual temperature measured by the temperature sensor provided in a portion of the motor (or inverter). On the contrary, "the overheat temperature for the winding temperature estimated value" is an overheat temperature with respect to a winding temperature estimated from a flowing current. Since the actual temperature is the temperature of a place itself in which the temperature sensor is provided, a protective temperature is directly designated. However, as for the estimated temperature, a calorific value is estimated from the current and a protective temperature is required to be determined in consideration of the thermal conductivity of an object the temperature of which is to be monitored. Therefore, the above two overheat temperatures preferably have different values. In terms that an overheat temperature for an actual temperature is preferably different from an overheat temperature for an estimated temperature, the same goes for the inverter temperature and a reactor temperature described later.

Next, in step S203, the internal temperature of the inverter 40 is detected and compared with an overheat temperature for the internal temperature.

Next, in step S204, a variation in the internal temperature of the inverter 40 is estimated from current feedback and compared with an overheat temperature for the internal temperature estimated value. As for the inverter 40, one or both of the measured temperature and the estimated temperature may be used for determining an output restriction.

Next, in step S205, one of the detected winding temperature, the detected inverter temperature, the estimated winding temperature, and the estimated inverter temperature that is the closest to the overheat temperature is chosen.

Next, in step S206, it is determined whether or not the chosen temperature closest to the overheat temperature is in the immediate vicinity of the overheat temperature.

When the chosen temperature closest to the overheat temperature is in the immediate vicinity of the overheat temperature, in step S207, an output restriction value is calculated according to a margin with respect to the overheat temperature, to impose a restriction on the output of the spindle motor.

On the other hand, when the chosen temperature closest to the overheat temperature is not in the immediate vicinity of the overheat temperature, in step S208, no restriction is imposed on the output of the spindle motor.

As described above, the machine tool controller according to the first embodiment of the present invention allows prevention of overheating by imposing an output restriction in consideration of an assessment of overheating in both of the spindle motor and the inverter (amplifier), which become a problem during driving the motor.

Second Embodiment

Figure 4:
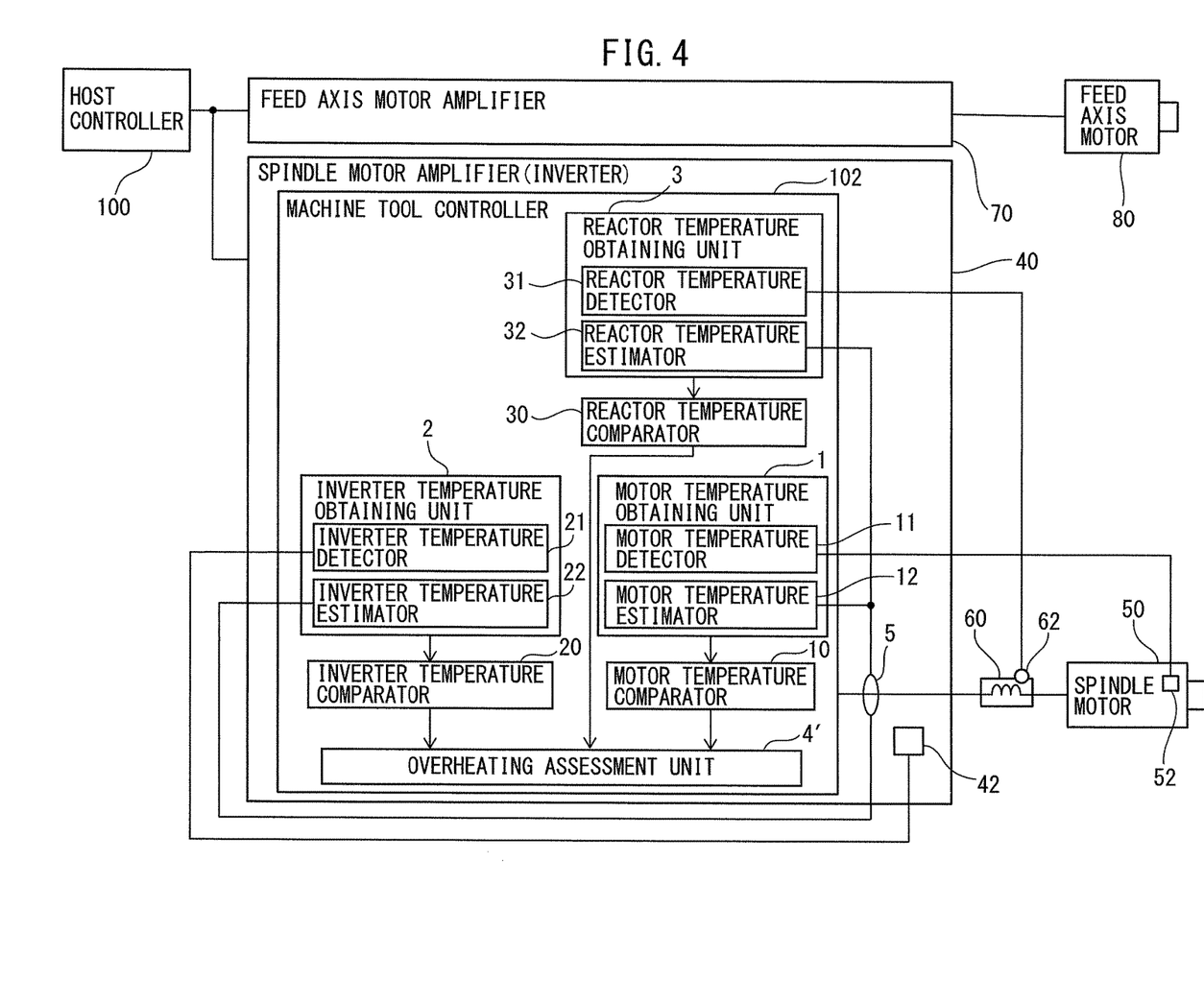
FIG. 4 is a block diagram showing the configuration of a control system including a machine tool controller according to a second embodiment of the present invention.

Next, a machine tool controller according to a second embodiment of the present invention will be described. FIG. 4 is a block diagram showing the configuration of a control system including the machine tool controller according to the second embodiment of the present invention. The control system includes a host controller 100, a spindle motor amplifier 40, a spindle motor 50, a feed axis motor amplifier 70, and a feed axis motor 80. A machine tool controller 102 according to the second embodiment of the present invention is provided within the spindle motor amplifier 40. The machine tool controller 102 is a controller for a machine tool, for controlling a spindle axis. The machine tool controller 102 includes a motor temperature obtaining unit 1, an inverter temperature obtaining unit 2, a reactor temperature obtaining unit 3, a motor temperature comparator 10, an inverter temperature comparator 20, a reactor temperature comparator 30, and an overheating assessment unit 4'. The difference between the machine tool controller 102 according to the second embodiment and the machine tool controller 101 according to the first embodiment is that the machine tool controller 102 further includes the reactor temperature obtaining unit 3 and the reactor temperature comparator 30, and the overheating assessment unit 4' imposes a restriction on the output of the spindle motor according to the smallest one of the difference between a motor temperature and an overheat temperature for the motor, the difference between an inverter temperature and an overheat temperature for the inverter, and the difference between a reactor temperature and an overheat temperature for a reactor. The other configuration of the machine tool controller 102 according to the second embodiment is the same as that of the machine tool controller 101 according to the first embodiment, so a detailed description is omitted.

The reactor temperature obtaining unit 3 obtains the winding temperature of a reactor 60 provided between the inverter 40 and the spindle motor 50 and outputs the winding temperature as a reactor temperature. The reactor temperature obtaining unit 3 includes at least one of a reactor temperature detector 31 and a reactor temperature estimator 32. The reactor temperature detector 31 measures the winding temperature of the reactor 60 using a temperature sensor 62 such as a thermistor provided in the reactor 60. The reactor temperature estimator 32 estimates the winding temperature of the reactor 60 from current feedback detected at the spindle motor amplifier 40, that is, a current flowing through the reactor 60 detected by a current sensor 5 provided in the spindle motor amplifier 40. In an example shown in FIG. 4, the reactor temperature obtaining unit 3 includes both of the reactor temperature detector 31 and the reactor temperature estimator 32, but not limited to this example, the reactor temperature obtaining unit 3 may include one of the reactor temperature detector 31 and the reactor temperature estimator 32.

The significance of the observation of both of the measured temperature (actual temperature) and the estimated temperature using both of the reactor temperature detector 31 and the reactor temperature estimator 32 of the reactor temperature obtaining unit 3 is as follows. That is, a sharp current variation causes a sudden increase in the temperature of a reactor winding itself (with a small (fast) time constant), while causing a slower increase in the temperature of the temperature sensor such as the thermistor embedded in the reactor winding (with a large (slow) time constant). Thus, the estimated temperature is used to monitor overheating with the small time constant, while the measured temperature (actual temperature) is used to monitor overheating with the large time constant.

The reactor temperature comparator 30 compares the reactor temperature outputted from the reactor temperature obtaining unit 3 with an overheat temperature for the reactor. The overheat temperature for the reactor, which refers to a temperature at which the reactor becomes overheated, is stored in advance in a memory (not shown).

The overheating assessment unit 4' imposes a restriction on the output of the spindle motor 50 according to the smallest one of the difference between the motor temperature and the overheat temperature for the motor, the difference between the inverter temperature and the overheat temperature for the inverter, and the difference between the reactor temperature and the overheat temperature for the reactor. As described above, the machine tool controller according to the second embodiment of the present invention imposes the restriction on the output of the spindle motor by focusing on the temperature closest to the overheat temperature, out of the measured temperatures and the estimated temperatures of the motor, the inverter, and the reactor. That is, the output restriction based on three of the motor temperature, the inverter temperature, and the reactor temperature allows preventing a machine stoppage owing to an overheat alarm. Next, the operation of the machine tool controller according to the second embodiment of the present invention will be described with reference to a flowchart shown in FIG. 5. First, in step S301, the motor temperature obtaining unit 1 obtains the winding temperature of the spindle motor 50, and outputs the winding temperature to the motor temperature comparator 10 as a motor temperature. As described above, the motor temperature obtaining unit 1 includes at least one of the motor temperature detector 11 and the motor temperature estimator 12. The motor temperature obtaining unit 1 outputs the measured temperature of the spindle motor detected by the motor temperature detector 11, the estimated temperature of the spindle motor estimated by the motor temperature estimator 12, or both of the measured temperature and the estimated temperature to the motor temperature comparator 10 as the motor temperature. Next, in step S302, the inverter temperature obtaining unit 2 obtains the temperature of the spindle motor amplifier, i.e. inverter 40, and outputs the temperature to the inverter temperature comparator 20 as an inverter temperature. As described above, the inverter temperature obtaining unit 2 includes at least one of the inverter temperature detector 21 and the inverter temperature estimator 22. The inverter temperature obtaining unit 2 outputs the measured temperature of the inverter 40 by the inverter temperature detector 21, the estimated temperature of the inverter 40 by the inverter temperature estimator 22, or both of the measured temperature and the estimated temperature to the inverter temperature comparator 20 as the temperature of the inverter (spindle motor amplifier) 40.

Figure 5:
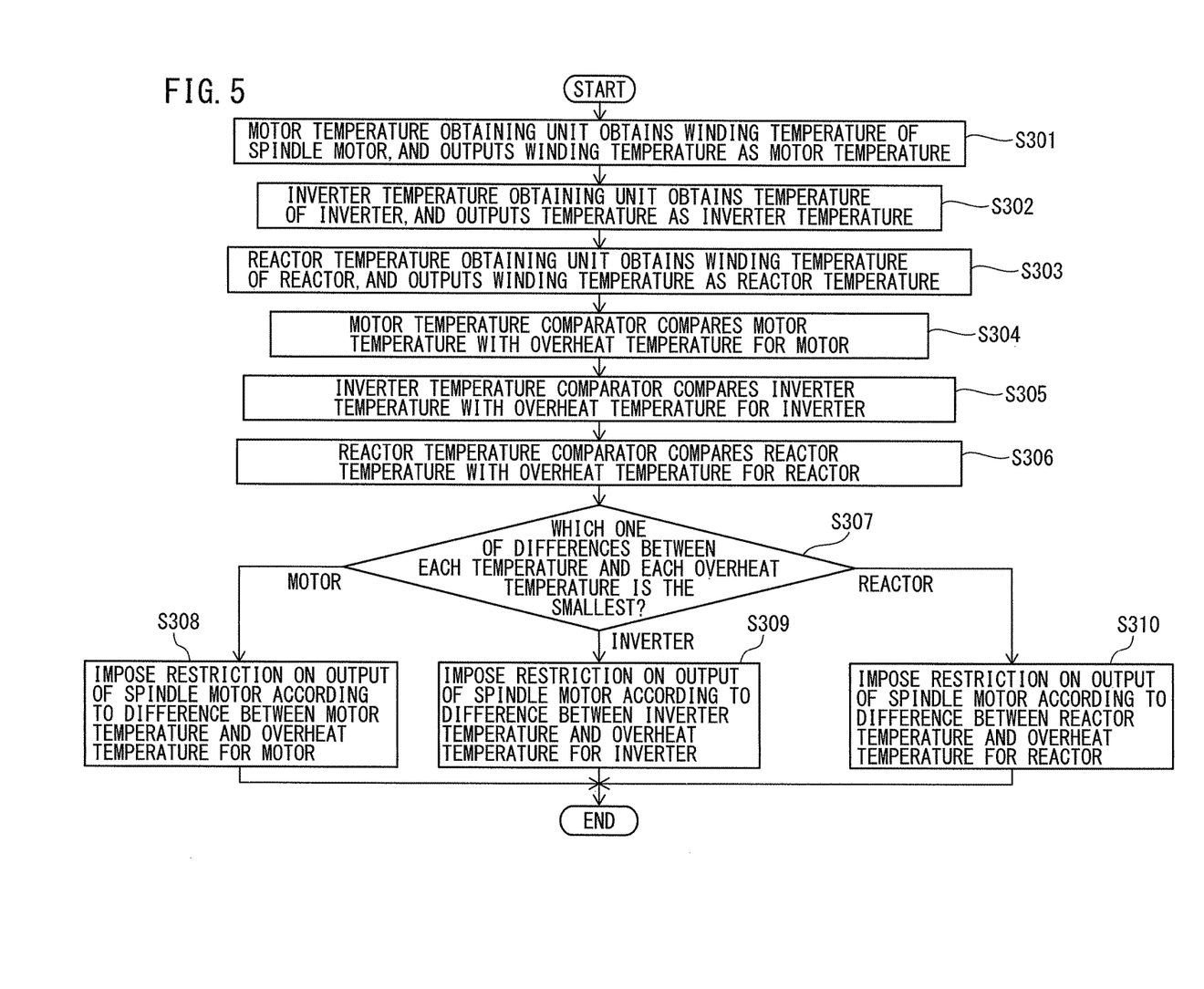
FIG. 5 is a flowchart of the operation of the machine tool controller according to the second embodiment of the present invention.

Next, in step S303, the reactor temperature obtaining unit 3 obtains the winding temperature of the reactor 60, and outputs the winding temperature to the reactor temperature comparator 30 as a reactor temperature. As described above, the reactor temperature obtaining unit 3 includes at least one of the reactor temperature detector 31 and the reactor temperature estimator 32. The reactor temperature obtaining unit 3 outputs the measured temperature of the reactor by the reactor temperature detector 31, the estimated temperature of the reactor by the reactor temperature estimator 32, or both of the measured temperature and the estimated temperature to the reactor temperature comparator 30 as the reactor temperature.

Next, in step S304, the motor temperature comparator 10 compares the motor temperature outputted from the motor temperature obtaining unit 1 with an overheat temperature for the motor. To be more specific, the motor temperature comparator 10 calculates the difference between the motor temperature and the overheat temperature for the motor, and outputs the difference to the overheating assessment unit 4'. The difference between the motor temperature and the overheat temperature for the motor is calculated using the measured temperature, the estimated temperature, or both of the measured temperature and the estimated temperature as the motor temperature.

Next, in step S305, the inverter temperature comparator 20 compares the inverter temperature obtained by the inverter temperature obtaining unit 2 with an overheat temperature for the inverter. To be more specific, the inverter temperature comparator 20 calculates the difference between the inverter temperature and the overheat temperature for the inverter, and outputs the difference to the overheating assessment unit 4'. The difference between the inverter temperature and the overheat temperature for the inverter is calculated using the measured temperature, the estimated temperature, or both of the measured temperature and the estimated temperature as the inverter temperature.

Next, in step S306, the reactor temperature comparator 30 compares the reactor temperature obtained by the reactor temperature obtaining unit 3 with an overheat temperature for the reactor. To be more specific, the reactor temperature comparator 30 calculates the difference between the reactor temperature and the overheat temperature for the reactor, and outputs the difference to the overheating assessment unit 4'. The difference between the reactor temperature and the overheat temperature for the reactor is calculated using the measured temperature, the estimated temperature, or both of the measured temperature and the estimated temperature as the reactor temperature.

Next, in step S307, the overheating assessment unit 4' determines which one of the difference between the motor temperature and the overheat temperature for the motor, the difference between the inverter temperature and the overheat temperature for the inverter, and the difference between the reactor temperature and the overheat temperature for the reactor is the smallest.

When the difference between the motor temperature and the overheat temperature for the motor is the smallest, the temperature of the spindle motor 50 is the closest to the overheat temperature for the motor. Thus, out of the three components of the spindle motor 50, the inverter 40, and the reactor 60, the spindle motor 50 is determined to be the closest to an overheated state. In this case, in step S308, the machine tool controller 102 imposes a restriction on the output of the spindle motor 50 according to the difference between the motor temperature and the overheat temperature for the motor.

On the other hand, when the difference between the inverter temperature and the overheat temperature for the inverter is the smallest, the temperature of the inverter 40 is the closest to the overheat temperature for the inverter. Thus, out of the three components of the spindle motor 50, the inverter 40, and the reactor 60, the inverter 40 is determined to be the closest to an overheated state. In this case, in step S309, the machine tool controller 102 imposes a restriction on the output of the spindle motor 50 according to the difference between the inverter temperature and the overheat temperature for the inverter.

On the other hand, when the difference between the reactor temperature and the overheat temperature for the reactor is the smallest, the temperature of the reactor 60 is the closest to the overheat temperature for the reactor. Thus, out of the three components of the spindle motor 50, the inverter 40, and the reactor 60, the reactor 60 is determined to be the closest to an overheated state. In this case, in step S310, the machine tool controller 102 imposes a restriction on the output of the spindle motor 50 according to the difference between the reactor temperature and the overheat temperature for the reactor.

Figure 6:
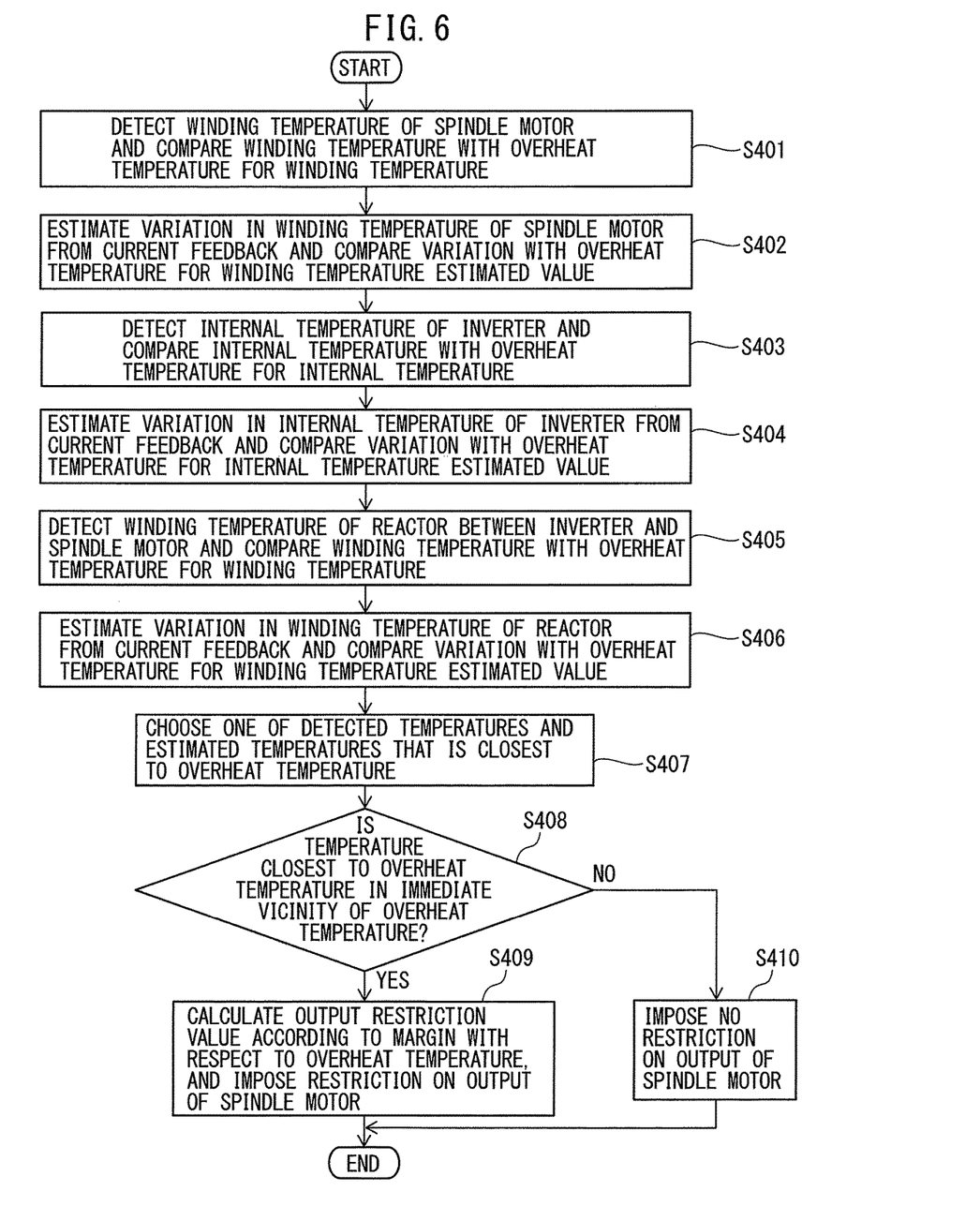
FIG. 6 is a flowchart of the operation of the machine tool controller according to a modification example of the second embodiment of the present invention.

Next, the operation of the machine tool controller according to a modification example of the second embodiment of the present invention will be described with reference to a flowchart of FIG. 6. First, in step S401, the winding temperature of the spindle motor 50 is detected and compared with an overheat temperature for the winding temperature.

Next, in step S402, a variation in the winding temperature of the spindle motor 50 is estimated from current feedback and compared with an overheat temperature for the winding temperature estimated value. As for the spindle motor 50, one or both of the measured temperature and the estimated temperature may be used for determining an output restriction.

Next, in step S403, the internal temperature of the inverter 40 is detected and compared with an overheat temperature for the internal temperature.

Next, in step S404, a variation in the internal temperature of the inverter 40 is estimated from current feedback and compared with an overheat temperature for the internal temperature estimated value. As for the inverter 40, one or both of the measured temperature and the estimated temperature may be used for determining an output restriction.

Next, in step S405, the winding temperature of the reactor 60 between the inverter 40 and the spindle motor 50 is detected and compared with an overheat temperature for the winding temperature.

Next, in step S406, a variation in the winding temperature of the reactor 60 is estimated from current feedback and compared with an overheat temperature for the winding temperature estimated value. As for the reactor 60, one or both of the measured temperature and the estimated temperature may be used for determining an output restriction.

Next, in step S407, one of the detected winding temperature, the detected inverter temperature, the detected reactor temperature, the estimated winding temperature, the estimated inverter temperature, and the estimated reactor temperature that is the closest to the overheat temperature is chosen.

Next, in step S408, it is determined whether or not the chosen temperature closest to the overheat temperature is in the immediate vicinity of the overheat temperature.

When the chosen temperature closest to the overheat temperature is in the immediate vicinity of the overheat temperature, in step S409, an output restriction value is calculated according to a margin with respect to the overheat temperature, to impose the restriction on the output of the spindle motor 50.

On the other hand, when the chosen temperature closest to the overheat temperature is not in the immediate vicinity of the overheat temperature, in step S410, no restriction is imposed on the output of the spindle motor 50.

As described above, the machine tool controller according to the second embodiment of the present invention allows prevention of overheating by imposing the output restriction in consideration of an assessment of overheating of three of the spindle motor, the inverter (amplifier), and the reactor, which become a problem during driving the motor.

The machine tool controllers according to the embodiments of the present invention allow prevention of overheating by imposing an output restriction in consideration of an assessment of overheating of the motor and the amplifier, which become a problem during driving the motor.

What is claimed is:

1. A machine tool controller for controlling a spindle and a feed axis, comprising:
    a processor configured for:
        obtaining the winding temperature of a spindle motor from a temperature sensor and outputting the winding temperature as a motor temperature;
        obtaining unit for obtaining the temperature of an inverter to drive the spindle motor and outputting the temperature as an inverter temperature;
        comparing the outputted motor temperature with an overheat temperature for the motor;
        comparing the outputted inverter temperature with an overheat temperature for the inverter; and
        for comparing the difference between the motor temperature and the overheat temperature for the motor to the difference between the inverter temperature and the overheat temperature for the inverter; and
        for controlling, based on the comparison, output of the spindle motor according to the smaller one of the of:
            the difference between the motor temperature and the overheat temperature for the motor, and
            the difference between the inverter temperature and the overheat temperature for the inverter.

2. The machine tool controller according to claim 1, further comprising: at least one of a motor temperature detector for measuring the winding temperature of the spindle motor and a motor temperature estimator for estimating the winding temperature of the spindle motor from current feedback detected at the inverter.

3. The machine tool controller according to claim 1, further comprising: at least one of an inverter temperature detector for measuring the temperature of the inverter and an inverter temperature estimator for estimating the temperature of the inverter from current feedback detected at the inverter.

4. The machine tool controller according to claim 1, further comprising:
    at least one of a motor temperature detector for measuring the winding temperature of the spindle motor and a motor temperature estimator for estimating the winding temperature of the spindle motor from current feedback detected at the inverter, and
    at least one of an inverter temperature detector for measuring the temperature of the inverter and an inverter temperature estimator for estimating the temperature of the inverter from current feedback detected at the inverter.

5. A machine tool controller for controlling a spindle and a feed axis, comprising:
    a processor configured for:
        obtaining the winding temperature of a spindle motor from a temperature sensor and outputting the winding temperature as a motor temperature;
        obtaining the temperature of an inverter to drive the spindle motor and outputting the temperature as an inverter temperature;
        obtaining the winding temperature of a reactor provided between the inverter and the spindle motor, and outputting the winding temperature as a reactor temperature;
        comparing the outputted motor temperature with an overheat temperature for the motor;
        comparing the outputted inverter temperature with an overheat temperature for the inverter;
        comparing the outputted reactor temperature with an overheat temperature for the reactor; and
        comparing the difference between the motor temperature and the overheat temperature for the motor to the difference between the inverter temperature and the overheat temperature for the inverter; and
        controlling, based on the comparison, output of the spindle motor according to the smallest one of:
            the difference between the motor temperature and the overheat temperature for the motor, the difference between the inverter temperature and the overheat temperature for the inverter, and
            the difference between the reactor temperature and the overheat temperature for the reactor.

6. The machine tool controller according to claim 5, further comprising: at least one of a motor temperature detector for measuring the winding temperature of the spindle motor and a motor temperature estimator for estimating the winding temperature of the spindle motor from current feedback detected at the inverter.

7. The machine tool controller according to claim 5, further comprising: at least one of an inverter temperature detector for measuring the temperature of the inverter and an inverter temperature estimator for estimating the temperature of the inverter from current feedback detected at the inverter.

8. The machine tool controller according to claim 5, further comprising: at least one of a reactor temperature detector for measuring the winding temperature of the reactor and a reactor temperature estimator for estimating the winding temperature of the reactor from current feedback detected at the inverter.

9. The machine tool controller according to claim 5, further comprising:
    at least one of a motor temperature detector for measuring the winding temperature of the spindle motor and a motor temperature estimator for estimating the winding temperature of the spindle motor from current feedback detected at the inverter, at least one of an inverter temperature detector for measuring the temperature of the inverter and an inverter temperature estimator for estimating the temperature of the inverter from current feedback detected at the inverter, and
at least one of a reactor temperature detector for measuring the winding temperature of the reactor and a reactor temperature estimator for estimating the winding temperature of the reactor from current feedback detected at the inverter.

* * * * *